United States Patent
Liao (10) Patent No.: US 9,426,687 B2
(45) Date of Patent: Aug. 23, 2016

(54) METHOD OF HANDLING NON-ACCESS STRATUM MESSAGE AND RELATED COMMUNICATION DEVICE

(71) Applicant: HTC Corporation, Taoyuan County (TW)

(72) Inventor: Ching-Yu Liao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 214 days.

(21) Appl. No.: 13/974,005

(22) Filed: Aug. 22, 2013

(65) Prior Publication Data

US 2014/0064069 A1   Mar. 6, 2014

Related U.S. Application Data

(60) Provisional application No. 61/694,276, filed on Aug. 29, 2012.

(51) Int. Cl.
| | |
|---|---|
| *H04L 12/26* | (2006.01) |
| *H04W 28/02* | (2009.01) |
| *H04W 76/02* | (2009.01) |
| *H04W 60/00* | (2009.01) |

(52) U.S. Cl.
CPC ....... *H04W 28/0226* (2013.01); *H04W 76/027* (2013.01); *H04W 60/00* (2013.01)

(58) Field of Classification Search
CPC ................................................. H04W 28/0226
USPC ........................................................ 370/252
See application file for complete search history.

(56) References Cited

U.S. PATENT DOCUMENTS

| | | | | |
|---|---|---|---|---|
| 2010/0099402 A1* | 4/2010 | Wu | ...................... | H04W 76/027 455/423 |
| 2012/0115454 A1 | 5/2012 | Liao | | |
| 2012/0178449 A1 | 7/2012 | Liao | | |
| 2012/0269122 A1* | 10/2012 | Lee | ...................... | H04W 76/066 370/328 |
| 2012/0275401 A1* | 11/2012 | Sun | ........................ | H04W 72/04 370/329 |
| 2012/0294143 A1* | 11/2012 | Niemi | ............... | H04W 36/0022 370/230 |
| 2012/0294144 A1* | 11/2012 | Niemi | ............... | H04W 36/0022 370/230 |

(Continued)

FOREIGN PATENT DOCUMENTS

| | | |
|---|---|---|
| CN | 102547912 A | 7/2012 |
| CN | 102595556 A | 7/2012 |

(Continued)

OTHER PUBLICATIONS

European patent application No. 13181635.7, European Search Report mailing date:Jan. 27, 2014.

(Continued)

*Primary Examiner* — Guang Li
(74) *Attorney, Agent, or Firm* — Winston Hsu; Scott Margo (57) ABSTRACT

A method of handling non-access stratum (NAS) mobility management (MM) messages for a user equipment in a wireless communication system when the user equipment is configured for dual priority includes sending a first NAS MM request message containing a first priority level to a network in the wireless communication system, and storing a priority indicator indicating the first priority level in a non-volatile memory if the user equipment receives a NAS MM reject message with a mobility management back-off (MMBK) timer from the network.

20 Claims, 4 Drawing Sheets

(56) References Cited

U.S. PATENT DOCUMENTS

| | | | | |
|---|---|---|---|---|
| 2013/0155954 A1* | 6/2013 | Wang | ............... | H04W 4/005 370/328 |
| 2013/0182644 A1* | 7/2013 | Kim et al. | ............... | 370/328 |
| 2013/0201870 A1* | 8/2013 | Gupta | ............... | H04W 4/005 370/254 |
| 2013/0203399 A1* | 8/2013 | Gupta | ............... | H04W 28/12 455/418 |

FOREIGN PATENT DOCUMENTS

| | | |
|---|---|---|
| CN | 102595638 A | 7/2012 |
| EP | 2477449 A1 | 7/2012 |
| WO | 2011156264 A2 | 12/2011 |

OTHER PUBLICATIONS

Intel, "MM timer handling for dual priority requirement", 3GPP TSG-CT WG1 Meeting #78, C1-122066, Kyoto (Japan), May 21-25, 2012, XP050588253, p. 1-30.

Huawei, HiSilicon, "Discussion on implementing dual access priority ", 3GPP TSG CT WG1 Meeting #78, C1-122081, Kyoto (Japan), May 21-25, 2012, XP050588268, p. 1-5.

Qualcomm Incorporated, "Discussion on dual priority devices and CT1 issues", SA WG2 Meeting #90, S2-121517, Apr. 16-20, 2012—Bratislava , Slovakia (revision of S2-12xxxx), XP050632015, p. 1-3.

Huawei, Hisilicon, "About dual-priority UEs", 3GPP TSG SA WG2 Meeting #90, TD S2-121276, Apr. 16-20, 2012, Bratislava, Slovakia, XP050631812, p. 1-4.

Samsung, HTC, Intel, "UE knowledge that the back-off timer is running for low or normal priority", 3GPP TSG-CT WG1 Meeting #80, C1-124277, Prague (Czech Republic), Aug. 6-10, 2012, rev of C1-124268, XP055096848, p. 1-14.

Samsung, HTC, Intel, "MS knowledge that the back-off timer is running for low or normal priority", 3GPP TSG-CT WG1 Meeting #80, C1-124278, Prague (Czech Republic), Aug. 6-10, 2012, rev of C1-124269, XP055096843, p. 1-14.

HTC, "Handling of NAS signaling low priority indication at switch off", 3GPP TSG-CT WG1 Meeting #80, C1-123663, Prague (Czech Republic), Oct. 15-19, 2012, XP055096838, p. 1-15.

3GPP TS 24.301 v11.3.0, Jun. 2012.

3GPP TS 24.008 v11.3.0, Jun. 2012.

Office action mailed on Feb. 29, 2016 for the China application No. 201310385108.2, filed Aug. 29, 2013, pp. 1-11.

* cited by examiner

METHOD OF HANDLING NON-ACCESS STRATUM MESSAGE AND RELATED COMMUNICATION DEVICE

CROSS REFERENCE TO RELATED APPLICATIONS

This application claims the benefit of U.S. Provisional Application No. 61/694,276, filed on Aug. 29, 2012 and entitled "Method of handling UE configured with dual priority", the contents of which are incorporated herein in their entirety.

BACKGROUND OF THE INVENTION

1. Field of the Invention

The present invention relates to a method used in a wireless communication system and related communication device, and more particularly, to a method of handling non-access stratum (NAS) messages in a wireless communication system and related communication device.

2. Description of the Prior Art

A long-term evolution (LTE) system supporting the 3GPP Rel-8 standard and/or the 3GPP Rel-9 standard is developed by the 3rd Generation Partnership Project (3GPP) as a successor of a universal mobile telecommunications system (UMTS), for further enhancing performance of the UMTS to satisfy users' increasing needs. The LTE system includes a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), a serving gateway, etc. for NAS (Non Access Stratum) control. In UMTS system, a Serving GPRS Support Node (SGSN) is responsible for the delivery of data packets to the mobile devices back and forth within its geographical service area, including packet routing and transfer, mobility management (attach/detach and location management), logical link management, and authentication and charging functions. The MME provides the control plane function for mobility between LTE and 2G/3G access networks with the S3 interface terminating at the MME from the SGSN.

An access point name (APN) is used in the LTE and LTE-advanced (LTE-A) systems for establishing packet data connections, and is managed by the MME. Further, the APN is used for identifying a packet data network (PDN) or a service type (e.g. multimedia messaging service (MMS)), wherein the PDN or the service type is carried on the packet data connections.

The core network manages the mobile reachability by using mobile reachable timer, paging proceed factor (PPF), and implicit detach timer. The core network supervises the periodic tracking/routing/location area updating procedure of the UE via the mobile reachable timer. By default, the mobile reachable timer is set slightly larger than the periodic TAU/RAU/LAU timer. Upon expiry of the mobile reachable timer, the network shall clear the PPF flag and start the implicit detach timer. The value of the implicit detach timer is network dependent. Due to the clear of the PPF, the core network cannot page the UE during the period of the implicit detach timer. If the implicit detach timer expires before the UE contacts the network, the network shall implicitly detach the UE. The implicit detach timer shall be stopped when a NAS signaling connection is established for the UE.

NAS level congestion control contains functions of "APN based congestion control" and "General NAS level Mobility Management control". The use of the APN based congestion control is for avoiding and handling of EMM and ESM signalling congestion associated with UEs with a particular APN. With General NAS level Mobility Management control, the MME may also use the reject of NAS level Mobility Management signaling requests under general congestion conditions.

When the NAS level mobility management congestion control is applied due to network overload or congestion, the MME rejects an attach request, a tracking area update (TAU), a routing area update (RAU) or a service request from the UE, and the MME replies the UE with a mobility management back-off timer (MMBK) in a reject message. Then, the MME/SGSN enforces the MMBK timer by immediately rejecting any subsequent request from the UE targeting at connecting to the APN before the MMBK timer is expired.

When the UE is configured for dual priority, the UE is configured for NAS signaling low priority and also configured to override the NAS signaling low priority indicator. For example, the UE is allowed to initiate a NAS mobility management (MM) request message without indicating low access priority while an MMBK timer for another NAS MM request message with a low priority indicator is running. However, if the UE is switched off and then switched on before the expiry of an MMBK timer, the UE cannot determine which priority level the MMBK timer is associated to. In such a situation, the performance of the UE may be decreased.

Similar problems occur when the UE configured for dual priority has received a session management back-off (SMBK) timer for a specific APN.

Thus, how to handle NAS messages and back-off timers properly when the UE is configured for dual priority is a topic to be addressed and discussed in the industry.

SUMMARY OF THE INVENTION

The present invention therefore provides a method and related communication device for handling non-access stratum (NAS) messages so that the communication device configured for dual priority can operate properly when a back-off timer is running.

The present invention discloses a method of handling non-access stratum (NAS) mobility management (MM) messages for a user equipment in a wireless communication system when the user equipment is configured for dual priority. The method includes sending a first NAS MM request message containing a first priority level to a network in the wireless communication system; and storing a priority indicator indicating the first priority level in a non-volatile memory if the user equipment receives a NAS MM reject message with a mobility management back-off (MMBK) timer from the network.

The present invention further discloses a method of handling non-access stratum (NAS) session management (SM) messages for a user equipment in a wireless communication system when the user equipment is configured for dual priority. The method includes sending a first NAS SM request message containing a first priority level for a specific access point name (APN) to a network in the wireless communication system; and storing a priority indicator indicating the first priority level for the specific APN in a non-volatile memory if the user equipment receives a NAS SM reject message with a session management back-off (SMBK) timer for the specific APN from the network.

The present invention further discloses a communication device for handling non-access stratum (NAS) mobility management (MM) messages in a wireless communication system, wherein the communication device is configured for dual priority. The communication device includes a processing means and a storage unit. The storage unit is coupled to the processing means for storing a program code, which instructs the processing means to send a first NAS MM request message containing a first priority level to a network in the wireless communication system, and store a priority indicator indicating the first priority level in non-volatile memory if the communication device receives a NAS MM reject message with a mobility management back-off (MMBK) timer from the network.

The present invention further discloses a communication device of handling non-access stratum (NAS) session management (SM) messages in a wireless communication system, wherein the communication device is configured for dual priority. The communication device includes a processing means and a storage unit. The storage unit is coupled to the processing means for storing a program code, which instructs the processing means to send a first NAS SM request message containing a first priority level for a specific access point name (APN) to a network in the wireless communication system, and store a priority indicator indicating the first priority level for the specific APN in non-volatile memory if the communication device receives a NAS SM reject message with a session management back-off (SMBK) timer for the specific APN from the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
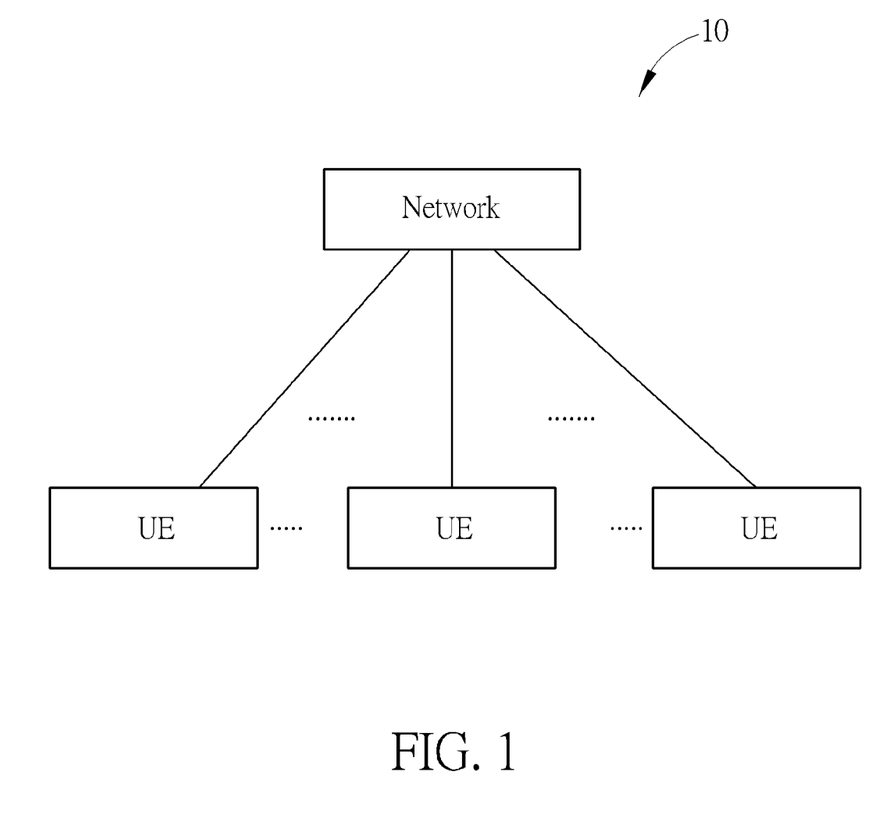
FIG. 1 is a schematic diagram of a wireless communications system according to an example of the present invention.

Please refer to FIG. 1, which is a schematic diagram of a wireless communication system 10 according to an example of the present invention. The wireless communication system 10, such as a General Packet Radio Service (GPRS) system, a Global System for Mobile communications (GSM) system, a Universal Mobile Telecommunications System (UMTS), a Long Term Evolution (LTE) system, a Long Term Evolution-advanced (LTE-A) system, or other mobile communication systems, is briefly composed of a network and a plurality of user equipments (UEs). In FIG. 1, the network and the UEs are simply utilized for illustrating the structure of the wireless communication system 10.

For the LTE system or other mobile communication systems alike, the network can be referred as to an E-UTRAN (evolved-UTRAN) comprising a plurality of evolved Node-Bs (eNBs) and relays. The network may also comprise a mobility management entity (MME), which is responsible for the delivery of data packets to the UEs back and forth within its geographical service area, including packet routing and transfer, mobility management (attach/detach and tracking area management), session management (PDN connection establishment/disconnect), logical link management, and authentication and charging functions. In addition, the MME may serve as a local mobility anchor for inter-working with other radio access technologies (RATs) (e.g. GSM and UMTS).

For the UMTS or other mobile communication systems alike, the network can be referred as to a UTRAN, which comprises a plurality of Node-Bs (NBs). The network may also comprise a Serving GPRS Support Node (SGSN), which is responsible for the delivery of data packets to the UEs back and forth within its geographical service area, including packet routing and transfer, mobility management (attach/detach and tracking area management), session management (PDP Context establishment/disconnect), logical link management, and authentication and charging functions.

For the GSM system or other mobile communication systems alike, the network can be referred as to a GSM Edge Radio Access Network (GERAN), which comprises a plurality of base stations (BSs). The network may also comprise a Mobile Switching Center (MSC), which is responsible for the delivery of voice service in a circuit switch manner to the UEs back and forth within its geographical service area, including mobility management (attach/detach and location area management), logical link management, and authentication and charging functions.

The UEs can be devices such as mobile phones, laptops, tablet computers, electronic books, and portable computer systems. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
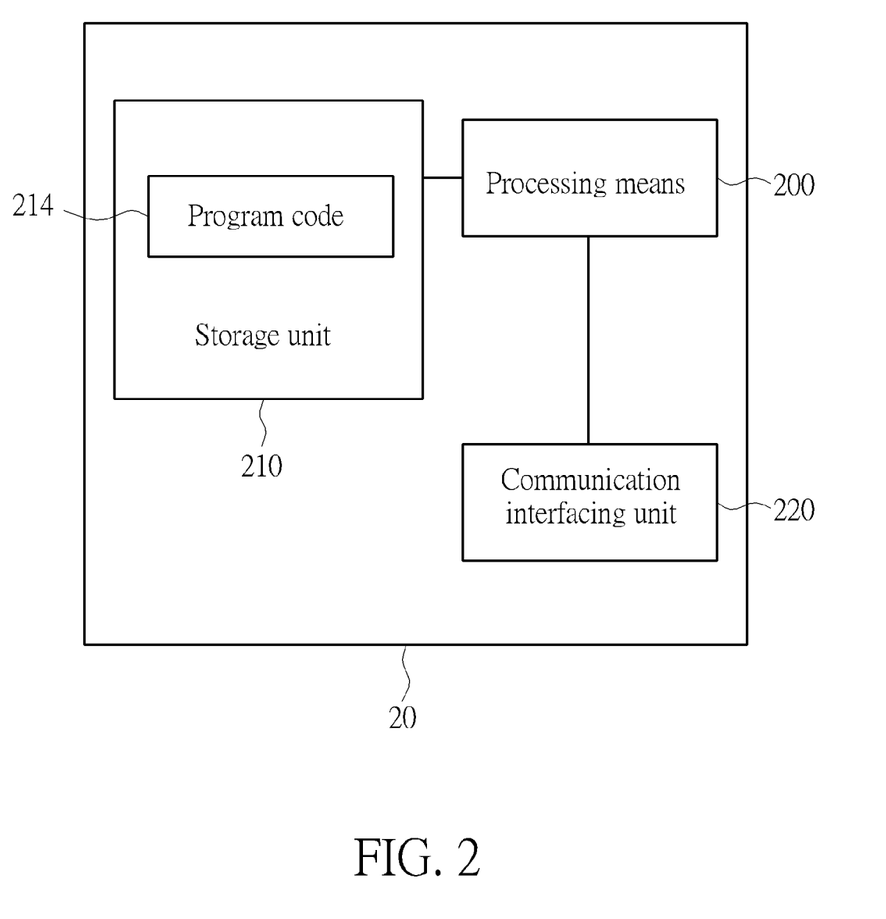
FIG. 2 is a schematic diagram of a communication device according to an example of the present invention.

Please refer to FIG. 2, which is a schematic diagram of a communication device 20 according to an example of the present invention. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a radio transceiver and can transmit and receive wireless signals (e.g., messages or packets) according to processing results of the processing means 200.

Figure 3:
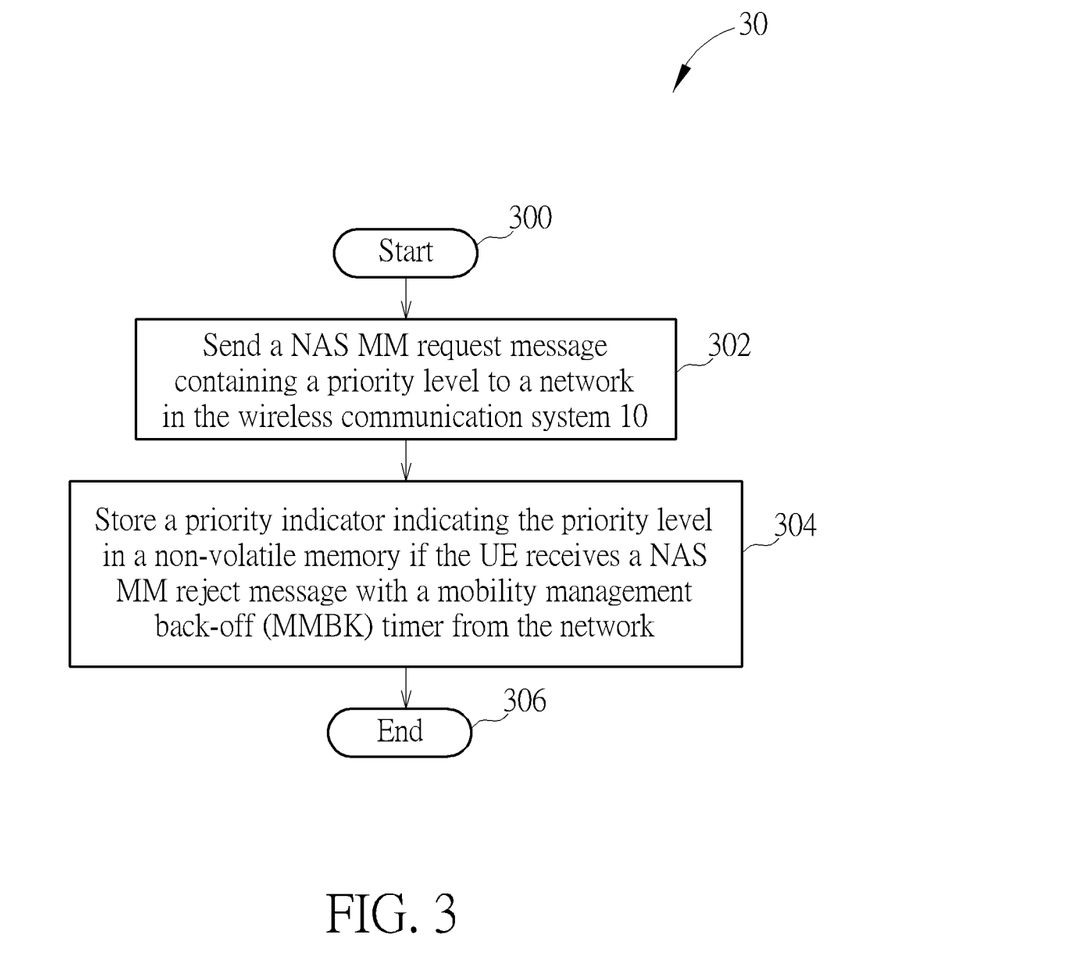
FIG. 3 is a flowchart of a process according to an example of the present invention.

Please refer to FIG. 3, which is a flowchart of a process 30 according to an example of the present invention. The process 30 is utilized for a UE to handle non-access stratum (NAS) mobility management (MM) messages in the wireless communication system 10 shown in FIG. 1, wherein the UE is configured for dual priority. The process 30 is implemented by the communication device 20 and may be com piled into the program code 214 to instruct the processing means 200 to execute the following steps:

Step 300: Start.

Step 302: Send a NAS MM request message containing a priority level to a network in the wireless communication system 10.

Step 304: Store a priority indicator indicating the priority level in a non-volatile memory if the UE receives a NAS MM reject message with a mobility management back-off (MMBK) timer from the network.

Step 306: End.

According to the process 30, the UE sends the NAS MM request message (e.g., a attach request message, a tracking area update request message, or an extended service request message) containing the priority level (e.g., low priority level or normal priority level) to the network. Under certain conditions (e.g. network overload or congestion), the network may reply the UE with the MMBK timer, which implies that the UE cannot resend the NAS MM request message containing the same priority level before the MMBK timer is expired. In addition, the UE needs to store the priority indicator in the non-volatile memory if the UE receives the MMBK timer. In this manner, the UE may check the MMBK timer and the priority indicator retaining in the non-volatile to determine whether it is allowed to initiate a new NAS MM request message after switched off and then switched on.

In detail, the UE initiates a new NAS MM request message according to the MMBK timer received prior to switched-off and the priority indicator retained in the non-volatile memory. If the priority indicator indicates that the priority level is low, the UE is allowed to initiate a new NAS MM request message not containing a low priority level. If the priority indicator indicates that the priority level is not low (i.e., normal priority level), the UE is not allowed to initiate a new NAS MM request message not containing a low priority level (i.e., normal priority level) before the expiry of the MMBK timer. As such, no matter whether the priority indicator indicates that the priority level is not low (i.e., normal priority level) or low, the UE is not allowed to initiate a new NAS MM request message containing a low priority level before the expiry of the MMBK timer. In other words, the UE is not allowed to initiate a new NAS MM request message containing a low priority level before the expiry of the MMBK timer.

Noticeably, the process 30 is an example of the present invention. Those skilled in the art should readily make combinations, modifications and/or alterations on the above-mentioned description and examples. For example, the priority indicator should be stored in the non-volatile memory before the UE is switched off, but the timing is not limited. In an embodiment, the UE may store the priority indicator indicating the priority level in the non-volatile memory whenever the user equipment receives a NAS MM reject message with the MMBK timer from the network. In another embodiment, the UE may store the priority indicator indicating the first priority level in the non-volatile memory just before the user equipment is switched off.

Moreover, information about the priority indicator and the associated MMBK timer should be handled independently for different domains. For example, the UE may store the priority indicator with the corresponding MMBK timer for a circuit switched (CS) domain (i.e. T3246) and the priority indicator with the corresponding MMBK timer for a packet switched (PS) domain (i.e. T3346) separately in the non-volatile memory. That is, the UE stores two priority indicators for both domains along with the associated MMBK timers in the non-volatile memory.

In addition, the UE may manage a correspondence among the priority indicator, the MMBK timer, and related information stored in the non-volatile memory. For example, if the MMBK timer is stopped for any reason, the corresponding information is invalid. If the remaining time of the MMBK timer is zero when the UE is switched on again, the UE clears the information of priority indicator so as to initiate a new NAS MM message afterward.

Figure 4:
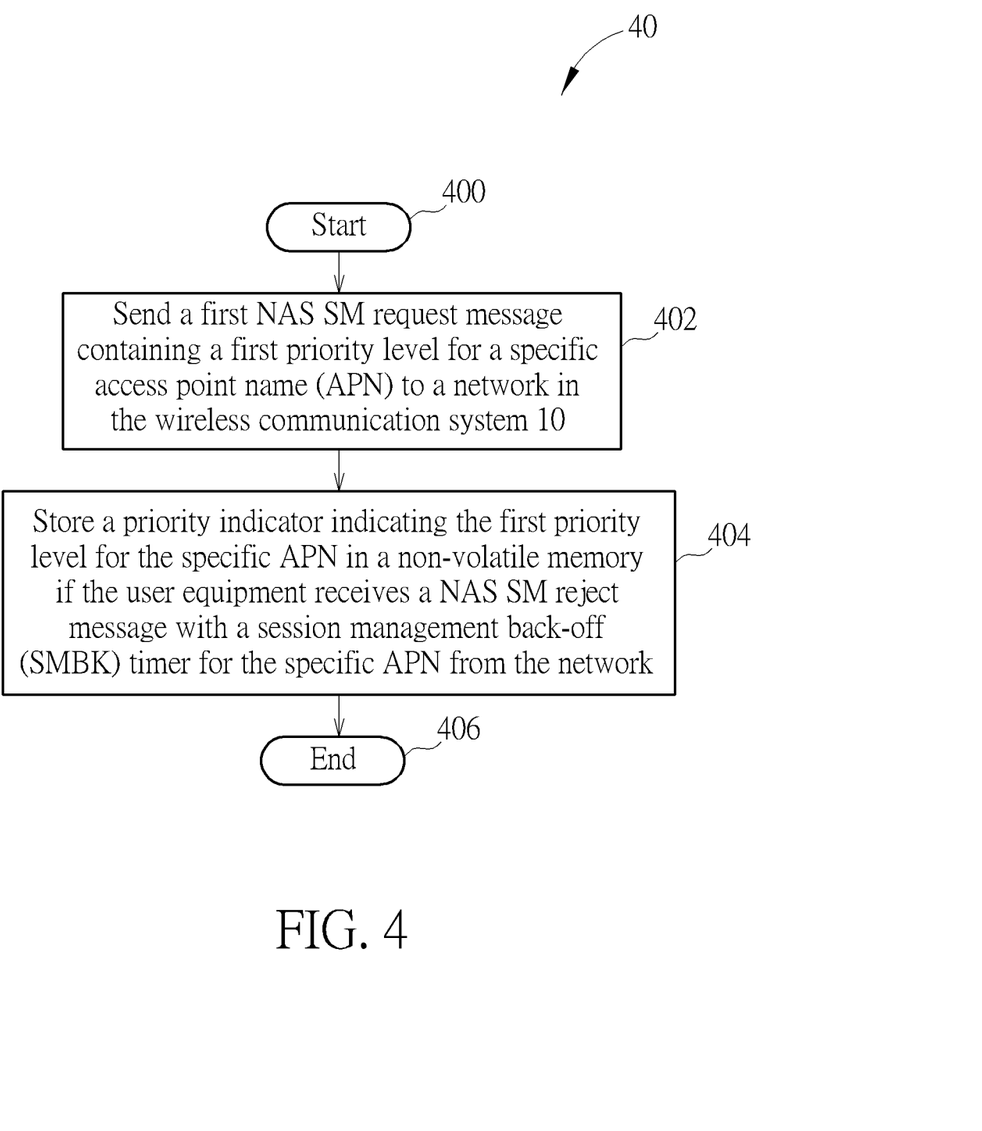
FIG. 4 is a flowchart of a process according to an example of the present invention.

Please refer to FIG. 4, which is a flowchart of a process 40 according to an example of the present invention. The process 40 is utilized for a UE to handle non-access stratum (NAS) session management (SM) messages in the wireless communication system 10 shown in FIG. 1, wherein the UE is configured for dual priority. The process 40 is implemented by the communication device 20 and may be compiled into the program code 214 to instruct the processing means 200 to execute the following steps:

Step 400: Start.

Step 402: Send a first NAS SM request message containing a first priority level for a specific access point name (APN) to a network in the wireless communication system 10.

Step 404: Store a priority indicator indicating the first priority level for the specific APN in a non-volatile memory if the user equipment receives a NAS SM reject message with a session management back-off (SMBK) timer for the specific APN from the network.

Step 406: End.

According to the process 40, the UE sends the NAS SM request message (e.g., a packet data network (PDN) connectivity request message, a bearer resource modification request message, or a bearer resource allocation request message) containing the priority level (e.g., low priority level or normal priority level) for a specific APN to the network. Under certain conditions (e.g. network overload or congestion), the network may reply the UE with the SMBK timer (e.g., T3396) for the specific APN, which implies that the UE cannot resend the NAS SM request message containing the same priority level for the specific APN before the SMBK timer is expired. In addition, the UE needs to store the priority indicator for the specific APN in the non-volatile memory if the UE receives the SMBK timer. In this manner, the UE may check the SMBK timer and the priority indicator for the specific APN retaining in the non-volatile to determine whether it is allowed to initiate a new NAS SM request message for the specific APN after switched off and then switched on.

In other words, the UE may receive SMBK timers for different APNs, such that the UE needs to store all of the priority indicators with the corresponding SMBK timers for different APNs separately in the non-volatile memory. For example, if the UE has received two SMBK timers associated to two different congested APNs, the UE stores two priority indicators indicating respective priority levels associated to two SMBK timers for the corresponding APNs.

In detail, the UE initiates a new NAS SM request message for a specific APN according to the SMBK timer received prior to switched-off and the priority indicator retained in the non-volatile memory for the specific APN. If the priority indicator indicates that the priority level for the specific APN is low, the UE is allowed to initiate a new NAS SM request message not containing a low priority level for the specific APN. If the priority indicator indicates that the priority level for the specific APN is not low (i.e., normal priority level), the UE is not allowed to initiate a new NAS SM request message not containing a low priority level (i.e., normal priority level) for the specific APN before the expiry of the corresponding SMBK timer. If the priority indicator indicates that the priority level is not low (i.e., normal priority level) or low for the specific APN, the UE is not allowed to initiate a new NAS SM request message containing a low priority level for the specific APN before the expiry of the corresponding SMBK timer. In other words, the UE is not allowed to initiate a new NAS SM request message containing a low priority level for the specific APN before the expiry of the SMBK timer for the specific APN.

Noticeably, the process 40 is an example of the present invention. Those skilled in the art should readily make combinations, modifications and/or alterations on the abovementioned description and examples. For example, the priority indicator for the specific APN should be stored in the non-volatile memory before the UE is switched off, but the timing is not limited. In an embodiment, the UE may store the priority indicator indicating the priority level for the specific APN in the non-volatile memory whenever the user equipment receives a NAS SM reject message with the SMBK timer for the specific APN from the network. In another embodiment, the UE may store the priority indicator indicating the first priority level for the specific APN in the non-volatile memory just before the user equipment is switched off.

The UE may also manage a correspondence among the priority indicator, the SMBK timer, the corresponding APN, and related information stored in the non-volatile memory. For example, if the SMBK timer is stopped for any reason, the corresponding information is invalid. If the remaining time of the SMBK timer for the specific APN is zero when the UE is switched on again, the UE clears the information of corresponding priority indicator so as to initiate a new NAS SM message for the same specific APN afterward.

The abovementioned steps of the processes 30 and 40 including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 20.

The type of non-volatile memory used for storing the priority indicator and/or related information is not limited, as long as the information can be retained when the UE is shut down. For example, the UE may store the information of the priority indicator along with the associated the MMBK/SMBK timer in a subscriber identity module (SIM), a universal subscriber identity module (USIM), or any other non-volatile memory such as flash memory, magnetic tape, hard disk, and optical data storage device, holographic memory.

In conclusion, the present invention provides a method for handling NAS MM messages and NAS SM messages by storing the priority indicator in the non-volatile memory and following the same constraint of the NAS MM/SM signalling messages received prior to switched-off (i.e., MMBK/SMBK timers and priority level) after the UE is switched on again. Therefore, the UE can properly determine which kind (i.e., priority level, domain, APN) of NAS MM/SM request message is allowed or not allowed to send to the network, so as to prevent the decrease of the UE or the network performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling non-access stratum (NAS) mobility management (MM) messages for a user equipment in a wireless communication system when the user equipment is configured for dual priority, the method comprising:
   sending a first NAS MM request message containing a first priority level to a network in the wireless communication system;
   storing a priority indicator indicating the first priority level in a non-volatile memory under a condition that the user equipment receives a NAS MM reject message with a mobility management back-off (MMBK) timer from the network before the user equipment is switched off; and
   determining whether the user equipment is allowed to initiate a second NAS MM request message according to the MMBK timer and the stored priority indicator after the user equipment is switched off the then switched on, wherein the information of priority indicator is cleared when the remaining time of the MMBK timer is zero after the UE is switched on again.

2. The method of claim 1, wherein the user equipment is allowed to initiate the second NAS MM request message not containing a low priority level when the priority indicator indicates the first priority level is low.

3. The method of claim 1, wherein the user equipment is not allowed to initiate the second NAS MM request message containing a low priority level before the expiry of the MMBK timer.

4. The method of claim 1, wherein the user equipment is not allowed to initiate the second NAS MM request message not containing a low priority level before the expiry of the MMBK timer under a condition that the priority indicator indicates the first priority level is not low.

5. The method of claim 1, wherein the user equipment stores the priority indicator indicating the first priority level in the non-volatile memory whenever the user equipment receives a NAS MM reject message with the MMBK timer from the network.

6. The method of claim 1, wherein the user equipment stores the priority indicator indicating the first priority level in the non-volatile memory before the user equipment is switched off.

7. The method of claim 1, wherein the first and the second NAS MM request messages are attach request messages, tracking area update request messages, or extended service request messages.

8. The method of claim 1, wherein the priority indicator with the corresponding MMBK timer for a circuit switched (CS) domain and the priority indicator with the corresponding MMBK timer for a packet switched (PS) domain are stored separately in the non-volatile memory.

9. A method of handling non-access stratum (NAS) session management (SM) messages for a user equipment in a wireless communication system when the user equipment is configured for dual priority, the method comprising:
   sending a first NAS SM request message containing a first priority level for a specific access point name (APN) to a network in the wireless communication system;
   storing a priority indicator indicating the first priority level for the specific APN in a non-volatile memory under a condition that the user equipment receives a NAS SM reject message with a session management back-off (SMBK) timer for the specific APN from the network before the user equipment is switched off; and determining whether the user equipment is allowed to initiate a second NAS SM request message for the specific APN according to the SMBK timer and the stored priority indicator for the specific APN after the user equipment is switched off and then switched on, wherein the information of priority indicator is cleared when the remaining time of the SMBK timer is zero after the UE is switched on again.

10. The method of claim 9, wherein the user equipment is allowed to initiate the second NAS SM request message not containing a low priority level for the specific APN under a condition that the priority indicator indicates the first priority level for the specific APN is low.

11. The method of claim 9, wherein the user equipment is not allowed to initiate the second NAS SM request message containing a low priority level for the specific APN before the expiry of the SMBK timer for the specific APN.

12. The method of claim 9, wherein the user equipment is not allowed to initiate the second NAS SM request message not containing a low priority level for the specific APN before the expiry of the SMBK timer for the specific APN under a condition that the priority indicator indicates the first priority level for the specific APN is not low.

13. The method of claim 9, wherein the user equipment stores the priority indicator indicating the first priority level for the specific APN in the non-volatile memory whenever the user equipment receives a NAS SM reject message with the SMBK timer for the specific APN from the network.

14. The method of claim 9, wherein the user equipment stores the priority indicator indicating the first priority level for the specific APN in the non-volatile memory before the user equipment is switched off.

15. The method of claim 9, wherein the first and the second NAS SM request messages are packet data network (PDN) connectivity request messages, bearer resource modification request messages, or bearer resource allocation request messages.

16. A user equipment of handling non-access stratum (NAS) mobility management (MM) message in a wireless communication system when the user equipment is configured for dual priority, wherein the user equipment comprises:

a storage unit, for storing instructions of:

sending a first NAS MM request message containing a first priority level to a network in the wireless communication system;

storing a priority indicator indicating the first priority level in a non-volatile memory under a condition that the user equipment receives a NAS MM reject message with a mobility management back-off (MMBK) timer from the network before the user equipment is switched off; and determining whether the user equipment is allowed to initiate a second NAS MM request message according to the MMBK timer and the stored priority indicator after the user equipment is switched off and then switched on, wherein the information of priority indicator is cleared when the remaining time of the MMBK timer is zero after the UE is switched on again; and a processing means, coupled to the storage unit, configured to execute the instructions stored in the storage unit.

17. The user equipment of claim 16, wherein the user equipment is allowed to initiate the second NAS MM request message not containing a low priority level when the priority indicator indicates the first priority level is low.

18. The user equipment of claim 16, wherein the user equipment is not allowed to initiate the second NAS MM request message containing a low priority level before the expiry of the MMBK timer.

19. The user equipment of claim 16, wherein the user equipment is not allowed to initiate the second NAS MM request message not containing a low priority level before the expiry of the MMBK timer under a condition that the priority indicator indicates the first priority level is not low.

20. The user equipment of claim 16, wherein the user equipment stores the priority indicator indicating the first priority level in the non-volatile memory before the user equipment is switched off.

* * * * *